US012804028B2

(12) United States Patent
Olwal et al.

(10) Patent No.: US 12,804,028 B2
(45) Date of Patent: Nov. 17, 2026

(54) AUTHENTICATING USERS USING LOCALIZATION OF SPEECH OR CORRELATIONS IN AUDIO DATA

(71) Applicant: GOOGLE LLC, Mountain View, CA (US)

(72) Inventors: Alex Olwal, Santa Cruz, CA (US); Artem Dementyev, Needham, MA (US)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 18/737,269

(22) Filed: Jun. 7, 2024

(65) Prior Publication Data

US 2024/0406250 A1 Dec. 5, 2024

Related U.S. Application Data

(63) Continuation of application No. 18/160,856, filed on Jan. 27, 2023, now Pat. No. 12,015,663.

(51) Int. Cl.

| | |
|---|---|
| ***H04L 67/06*** | (2022.01) |
| ***G10L 17/02*** | (2013.01) |
| ***H04L 9/08*** | (2006.01) |

(52) U.S. Cl.

CPC .............. *H04L 67/06* (2013.01); *G10L 17/02* (2013.01); *H04L 9/0819* (2013.01)

(58) Field of Classification Search

CPC ..... H04W 12/06; H04W 12/63; H04W 12/65; H04W 12/50; H04L 67/06; H04L 9/0819; G10L 17/02

See application file for complete search history.

(56) References Cited

U.S. PATENT DOCUMENTS

| | | | | |
|---|---|---|---|---|
| 10,108,272 | B1 * | 10/2018 | DeBates | G06F 1/163 |
| 10,249,295 | B2 | 4/2019 | Liu et al. | |
| 2013/0289999 | A1 | 10/2013 | Hymel | |
| 2018/0047393 | A1 | 2/2018 | Tian et al. | |
| 2018/0198783 | A1 * | 7/2018 | Liu | H04W 76/10 |
| 2019/0080692 | A1 | 3/2019 | R et al. | |
| 2019/0174226 | A1 | 6/2019 | Yang et al. | |

(Continued)

OTHER PUBLICATIONS

International Search Report and Written Opinion for PCT Application No. PCT/US2024/013177, mailed on Apr. 29, 2024, 17 pages.

(Continued)

*Primary Examiner* — Bryan Y Lee

(74) *Attorney, Agent, or Firm* — Brake Hughes Bellermann LLP

(57) ABSTRACT

A method may receive a first audio signal data at a first device, the first audio signal data decoded using a microphone array. A method may determine that the first audio signal data includes an audio sequence relating to an information sharing request. A method may send a first signal. A method may receive a second signal via the microphone array responsive to the first signal. A method may verify that the second signal was sent from a direction of a voice associated with the audio sequence, the second signal including a second device identifier associated with a second device. A method may establish a wireless connection with the second device using the second device identifier.

20 Claims, 8 Drawing Sheets

(56) References Cited

U.S. PATENT DOCUMENTS

2021/0211823 A1 7/2021 Shani et al.

OTHER PUBLICATIONS

Blue, et al., "2MA: Verifying Voice Commands Via Two Microphone Authentication", ASIACCS'18, Session 3: Authentication, Jun. 4-8, 2018, pp. 89-100.
Yang, et al., "Displaying Active Speaker Video in a Meeting", ip.com, Cisco Systems, Inc., 2017, 12 pages.

* cited by examiner

200B

400B

AUTHENTICATING USERS USING LOCALIZATION OF SPEECH OR CORRELATIONS IN AUDIO DATA

CROSS-REFERENCE TO RELATED APPLICATION

This application is a continuation of, and claims priority to, U.S. patent application Ser. No. 18/160,856, filed on Jan. 27, 2023, entitled "AUTHENTICATING USERS USING LOCALIZATION OF SPEECH OR CORRELATIONS IN AUDIO DATA", the disclosure of which is incorporated by reference herein in its entirety.

BACKGROUND

Current methods of authenticating a user or user device before sharing information between user devices in a secure and convenient manner can be complicated and/or include many steps performed by the user. Sharing information between devices often relies on exchanging login information or sharing credentials in a way that is not user friendly. When more than two user devices are involved, current methods fail to scale, becoming particularly cumbersome. Many current methods to share information require that a user touch an interface on a device, which can interrupt the flow of social interactions with others. Other methods that do not require interfacing with a device, instead relying on prompts such as eye tracking clues and hand gestures, do not provide a high level of security when connecting user devices to share information.

SUMMARY

Disclosed methods and systems allow users to initiate authenticating their devices to exchange information starting with a verbal agreement. A wireless connection is established between the user devices. In some examples the wireless connection may be authenticated by verifying that a signal, for example, an ultrasound signal or an ultra-wideband signal, received from the other device comes from the same direction as a user's voice detected as part of the verbal agreement. In some examples, user devices may be authenticated by exchanging audio data obtained at each respective user device recording the verbal agreement to share information and comparing the audio data from each device to verify that it correlates. The methods disclosed herein may provide for a touch-free, seamless, and secure exchange of information between two users via their devices.

In some aspects, the techniques described herein relate to a method including: receiving a first audio signal data at a first device, the first audio signal data decoded using a microphone array; determining that the first audio signal data includes an audio sequence relating to an information sharing request; sending a first signal; receiving a second signal via the microphone array responsive to the first signal; verifying that the second signal was sent from a direction of a voice associated with the audio sequence, the second signal including a second device identifier associated with a second device; and establishing a wireless connection with the second device using the second device identifier.

In some aspects, the techniques described herein relate to a computing device including: microphone array; a processor; and a memory configured with instructions operable to: receive a first audio signal data at a first device, the first audio signal data decoded using a microphone array; determine that the first audio signal data includes an audio sequence relating to an information sharing request; send a first signal; receive a second signal via the microphone array responsive to the first signal; verify that the second signal was sent from a direction of a voice associated with the audio sequence, the second signal including a second device identifier associated with a second device; and establish a wireless connection with the second device using the second device identifier.

In some aspects, the techniques described herein relate to a method including: receiving a first audio signal data associated with a first device; determining that the first audio signal data includes at least a portion of an audio sequence relating to an information sharing request; establishing a wireless connection with a second device; requesting a second audio signal data from the second device via the wireless connection, the second audio signal data including at least the portion of an audio sequence; and verifying that the first audio signal data includes a first feature correlating to a second feature of the second audio signal data; and sending or receiving information relating to the information sharing request between the first device and the second device via the wireless connection.

In some aspects, the techniques described herein relate to a computing device including: a microphone; a processor; and a memory configured with instructions operable to: receive a first audio signal data associated with a first device; determine that the first audio signal data includes at least a portion of an audio sequence relating to an information sharing request; establish a wireless connection with a second device; request a second audio signal data from the second device via the wireless connection, the second audio signal data including at least the portion of an audio sequence; and verify that the first audio signal data includes a first feature correlating to a second feature of the second audio signal data; and send or receive information relating to the information sharing request between the first device and the second device via the wireless connection.

DETAILED DESCRIPTION

The present disclosure describes a seamless way to authenticate a verbal information sharing request between at least two users via their respective user devices. The method begins when one user asks a question or makes an offer, and the other user responds affirmatively to verbally communicate an information sharing request. The spoken phrases between the users indicating consent to send or receive information via their respective user devices are recorded at a first user device using a microphone, or in some instances with a microphone array which can determine the direction from which user voices may be heard based on the microphone array signals. In some instances, the spoken phrases are also recorded by at least a second user device as well.

Next, in a first aspect, the first user device sends a first signal in the direction of at least the second user to try to establish communication with the second user's user device. If the second user device sends a second signal in response, the first user device verifies that the second signal was received in the direction of the second user's voice. Upon verifying that both the second user's voice and the second signal came from the same direction, the second user device may be authenticated. The first user device may then establish a wireless connection with the second user device using a second device identifier received in the second signal.

In other examples, the devices may exchange the second device identifier orally and establish a wireless connection using the identifier, for example via Bluetooth.

In a second aspect that may be combined with the previous examples or used separately, the user devices may be authenticated by exchanging audio signal data between devices. The first user device may request an audio signal recording or other audio signal data including the audio sequence from the second device and compare that to its own audio signal recording or data including the audio sequence. Upon confirming that the data is correlated, the second device is authenticated.

After the first device authenticates the second device, the devices may send or receive the requested information.

Figure 1A:
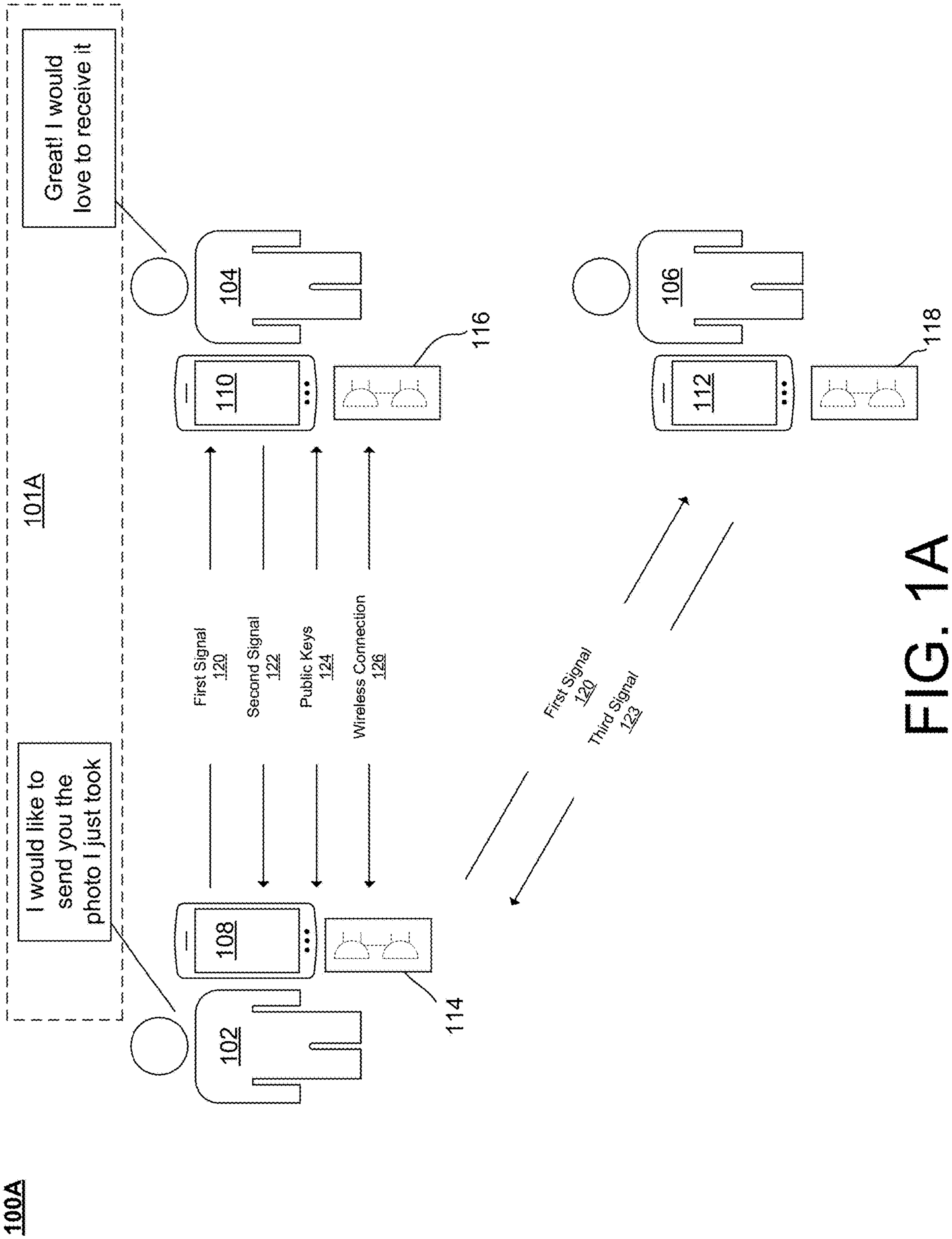
FIG. 1A depicts an example scenario 100A of users making and authenticating an information sharing request, according to an example.

FIG. 1A depicts a scenario 100A, according to an example. In scenario 100A, a first user 102 and a second user 104 engage in an audio sequence 101A. Audio sequence 101A begins with first user 102 proposing, "I would like to send you the photo I just took." second user 104 next replies, "Great! I would love to receive it!" While audio sequence 101A begins with a proposal and ends with an acceptance, in other examples it may begin with a request and end with an answer. In some implementations, audio sequence 101A may include any exchange of statements between users that may indicate an agreement to share information between user devices.

First user 102 is associated with a first device 108, and second user 104 is associated with a second device 110. In examples, first device 108 may be a handheld device, such as a smartphone or a tablet computer, or a wearable device, such as a smart watch, an augmented reality headset, a virtual reality headset, or a lanyard type device. In examples, first device 108 may be a laptop computer, or even a desktop computer. Second device 110 may be the same device type as first device 108 or a different one. Second device 110 may include any of the features described with respect to first device 108 herein.

Figure 2A:
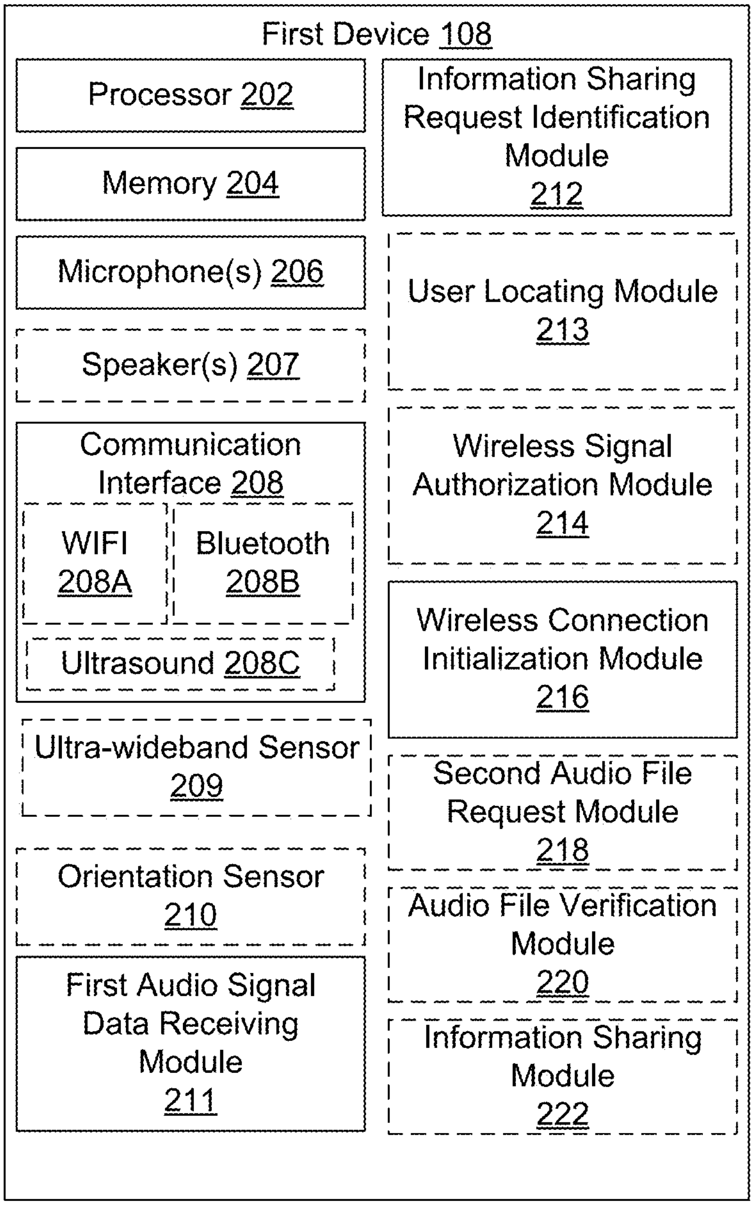
FIG. 2A depicts a block diagram of a user device 108, according to an example.

FIG. 2A depicts a block diagram of first device 108. First device 108 includes a processor 202, a memory 204, a microphone(s) 206, a communication interface 208, a first audio signal data receiving module 211, an information sharing request identification module 212, and a wireless connection initialization module 216. In examples, first device 108 may further include any combination of: speaker (s) 207, an ultra-wideband (UWB) sensor, or UWB sensor 209, an orientation sensor 210, a user locating module 213, a wireless signal authorization module 214, a second audio file request module 218, an audio file verification module 220, and an information sharing module 222.

In examples, processor 202 may include multiple processors, and memory 204 may include multiple memories. Processor 202 may be in communication with any sensors or other modules and electronics of first user 102. Processor 202 is configured by instructions (e.g., software, application, modules, etc.) to authorize the exchange of information between two devices. The instructions may include non-transitory computer readable instructions stored in, and recalled from, memory 204. In examples, the instructions may be communicated to processor 202 from another computing device via a communication interface 208.

First device 108 is coupled to microphone(s) 206 operable to decode (e.g., to detect, measure, and/or record) an acoustic signal. The acoustic signals detected may be further processed by first device 108 or second device 110 to generate an audio signal data. In examples, the audio signal data may comprise an audio file including all or part of audio sequence 101A. In further examples, however, the audio signal data may further comprise a hash, a transcribed text, or a checksum of the audio file for audio sequence 101A.

In examples, microphone(s) 206 may be built into or internal to first device 108. In further examples, however, microphone(s) 206 may be included in one or more external devices that are in communication with first device 108. For example, if first device 108 is a smart phone, microphone(s) 206 may be a set of wireless earbuds.

Microphone(s) 206 may comprise first microphone array 114. In examples, first device 108 may be in communication with a first microphone array 114 and/or second device 110 may be in communication with a second microphone array 116. Microphone array 114 and/or second microphone array 116 may be configured to capture acoustical audio signals that include sounds from around a user. In examples, first microphone array 114 and/or second microphone array 116 may be configured to detect audible and inaudible sounds. The inaudible sounds (e.g., ultrasound signals) may be generated by transducers associated with speakers, for example.

In some examples, first microphone array 114 and/or second microphone array 116 may include a plurality of microphones that are each configured to convert sounds from the environment into an audio stream (i.e., audio channel). Each microphone can be omnidirectional so that, individually, sounds from all directions are sensed with the same sensitivity. While each microphone may have an omnidirectional sensitivity to the sounds in the environment, the microphone array may have a sensitivity that is directional. Beamforming may be used on the channels to filter and direct particular audible or inaudible sounds toward particular other devices in a physical space.

First device 108 may further include speaker(s) 207. Speaker(s) 207 may be operable to emit audible and inaudible sounds. For example, speaker(s) 207 may be operable to emit ultrasonic sounds in the form of omnidirectional acoustical waves with a uniform intensity or directional acoustical waves.

Communication interface 208 of first device 108 may be operable to facilitate communication between first device 108 and one or more user devices, such as second device 110. In examples, communication interface 208 may include any combination of a WIFI interface 208A, a Bluetooth interface 208B, or an ultrasonic interface 208C. In examples, communication interface 208 may include any other wireless or wired communication methods. For example, communication interface 208 may include a Zigbee™ interface.

UWB sensor 209 of first device 108 may include a radio-based communication technology configured for short-range use. In examples, UWB sensor 209 may emit pulses including any combination of: an identifier, Time of Flight, and other timestamp data. UWB sensor 209 may be operable to obtain distance information to another device with a UWB beacon. In examples, UWB sensor 209 may be operable to obtain angle of arrival information, which, in combination with distance, may allow for the determination of a relative location of another device with a UVB beacon. In examples where there are at least three additional UWB devices in a room, it may be possible to triangulate a position of first device 108. In examples, the distance information may be determined via Time Difference of Arrival technique, a direct or power reflection ratio technique, or any other technique. Orientation sensor 210 of first device 108 may be implemented as any combination of accelerometers, gyroscopes, and magnetometers combined to form an inertial measurement unit (i.e., IMU) operable to determine an orientation of first device 108.

In examples, processor 202 of first device 108 may be configured with instructions to execute one or more modules. For example, processor 202 may be configured to execute first audio signal data receiving module 211. First audio signal data receiving module 211 is configured to receive audio signal data recorded using microphone(s) 206. First audio signal data may be associated with first device 108 and may include the audio sequence relating to the information sharing request.

In examples, first audio signal data may be received from a device or accessory integral with or communicatively coupled to first device 108, such as microphone(s) 206. In other examples, the first audio signal data may be received from another module within first device 108. In examples, the audio signal data may comprise an audio file including all or part of audio sequence 101A, recorded from one microphone or with an array of microphones integrated within or adjacent to first device 108.

In examples, processor 202 may be further configured with instructions to execute information sharing request identification module 212. Information sharing request identification module 212, may be operable to determine that first audio signal data received includes at least a portion of an audio sequence relating to an information sharing request.

In examples, information sharing request identification module 212 may operate by identifying a trigger word or phrase. For example, a trigger word or phrase may comprise “wake up” or “I am ready to share now.” In further examples, information sharing request identification module 212 may operate by listening continuously and identifying words or phrases that signal an intent or request to share. In examples, first device 108 may include one or more software or operating system settings allowing a user to configure whether information sharing request identification module 212 utilizes trigger words or phrases or listens continuously for speech indicating an intent or request to share.

In examples, processor 202 may be further configured with instructions to execute user locating module 213. User locating module 213 may be operable to determine a direction of a user not associated with first device 108 based on the first audio signal data.

In examples, user locating module 213 may begin by identifying at least two separate voices on the first audio signal data. In examples, a first user voice associated with first user 102 may be identified as the voice closest to first device 108 by identifying the voice with the highest sound intensity in audio sequence 101A. In examples, the first user voice may be identified via a predetermined voice ID. In examples, the first user voice may be identified by determining which voice in the audio sequence excites each microphone in a microphone array of data equally, indicating close proximity to first device 108. In examples, the first user voice may be determined using automatic voice recognition activity, for example by correlating data from orientation sensor 210 indicating vibrations (from voice or movement) with a voice.

In examples, user locating module 213 may identify a second user voice associated with second user 104. In examples, user locating module 213 may identify additional voices associated with additional users, according to any of the ways described with respect to the second user 104 herein.

In examples, user locating module 213 may identify the second user voice based on voice ID. In examples where microphone(s) 206 comprise a microphone array, user locating module 213 may determine a direction of second user 104 with respect to first device 108 based on a difference in intensity with respect to the microphones in the microphone array. In examples, first device 108 may estimate a distance between first device 108 and second user 104 based on a sound intensity of the second voice. In examples where first device 108 includes microphone array 114 and orientation sensor 210, user locating module 213 may estimate a direction, distance, and/or location of second user 104 within a space. User locating module 213 may utilize any of the voice location methods described herein to identify a user voice in an audio sequence captured in first audio signal data.

User locating module 213 may be configurable via one or more software settings or operating system controls, allowing first user 102 to elect both if and when user information (e.g., information about a user’s social network, social actions, or activities, profession, a user’s preference, or current location) or personally identifiable information is saved. In examples, second device 110 may also include software or operating system settings to elect whether user information or personally identifiable information is saved.

In examples, processor 202 may be further configured with instructions to execute wireless signal authorization module 214. As may be seen in FIG. 1A, wireless signal authorization module 214 may send a first signal 120 in the direction of a voice in audio sequence 101A using speaker(s) 207. In examples, first signal 120 may be transmitted via an ultrasound, UWA, or any other type of wireless medium. First signal 120 may comprise a data packet or one or more chirps sent from first device 108. In examples, first signal 120 may include a first device identifier for first device 108.

Wireless signal authorization module 214 may then receive a second signal 122 via the microphone array responsive to first signal 120. In examples, second signal 122 may include an ultrasound signal, a UWB signal, or any other type of wireless signal including an acknowledgment data packet, or one or more acknowledgement chirps.

In examples, wireless signal authorization module 214 may verify that second signal 122 was received in the direction of the voice to authenticate that second device 110 is indeed associated with second user 104.

In examples, first device 108 may use time-of-departure and/or time-of-arrival measurements within second signal 122 to calculate a time-of-flight between first device 108 and second device 110. In examples, a time difference of arrival algorithm or a direct/reflection ratio technique may be used. to estimate a distance between second device 110 and first device 108. The estimated distance between first device 108 and second device 110 may be compared to an estimated distance between first device 108 and the second voice of second user 104 to authenticate second device 110.

In examples, second signal 122 may include a second device identifier for second device 110. In examples, the second device identifier may be used to establish a wireless connection with second device 110.

In examples, the second device identifier may be an IP address, a BLUETOOTH identifier or a Zigbee identifier. An identifier may comprise a unique address assigned to a device by a manufacturer or via software. In examples, the identifier may be a user-designated name. The second device identifier may be used to establish a wireless connection between first device 108 and second device 110.

By authenticating second device 110 using first signal 120 sent in the direction of the second user's voice and verifying that second signal 122 is received from the direction of the second user's voice, it may be possible to authenticate a connection to a user device that is very likely to be associated with the second user. This may provide for a convenient, seamless, secure way to authenticate a device with minimal interaction required between first user 102 and first device 108.

In examples, first device 108 and second device 110 may include settings or operating system settings allowing a user to opt out of responding to first signal 120 or requiring a user action before responding with second signal 122.

In examples, processor 202 may be further configured with instructions to execute wireless connection initialization module 216. Wireless connection initialization module 216 may be operable to initiate a wireless connection, for example using the second device identifier. For example, first device 108 and second device 110 may establish wireless connection 126 comprising a WIFI, Bluetooth, Zigbee™, ultrasound, or any other type of wireless connection.

In examples, wireless connection initialization module 216 may initialize an exchange of public keys 124 between first device 108 and second device 110 to configure wireless connection 126 as a secure, encrypted communication channel.

In FIG. 1A, it may be seen that scenario 100A may further comprise an additional user, third user 106. Third user 106 is associated with a third device 112, which may be similar to first device 108. In examples, third device 112 may be associated with a third microphone array 118, which may be similar to first microphone array 114.

As may be seen in scenario 100A, third user 106 has not participated in audio sequence 101A. Third user 106 is also positioned in a different direction from second user 104 with respect to first user 102.

In examples, third device 112 may receive first signal 120. In response, third device 112 may respond with a third ultrasound signal 123, which may be received by first device 108. In other words, first device 108 may receive signals responsive to first signal 120 from two user devices, one that is associated with a voice received during audio sequence 101A, and one that is not. First device 108 may authenticate which device to connect to by determining which directions second signal 122 and third ultrasound signal 123 are received from and comparing those directions to the direction that the second voice was received from. Because third ultrasound signal 123 is received from a different direction than the voice of second user 104, first device 108 does not respond to third ultrasound signal 123 by connecting with third device 112.

In examples, processor 202 of first device 108 may be further configured with instructions to execute information sharing module 222. Information sharing module 222 may be operable to share the information subject to the information sharing request. In examples, the information may comprise any combination of a file, a message, contact information, or information providing access to a shared resource. For example, the information may comprise a photo, a video, a song, or an invitation to access a music playlist. In further examples, information sharing module 222 may share any other type of information.

By authenticating second device 110 associated with second user 104 based on the location of the second voice before exchanging information, it may be possible to have a seamless, secure exchange of information between users that is triggered by casual conversation. Therefore, the exchange of information may not require either user to interact with the user interfaces of their respective user devices.

Figure 3:
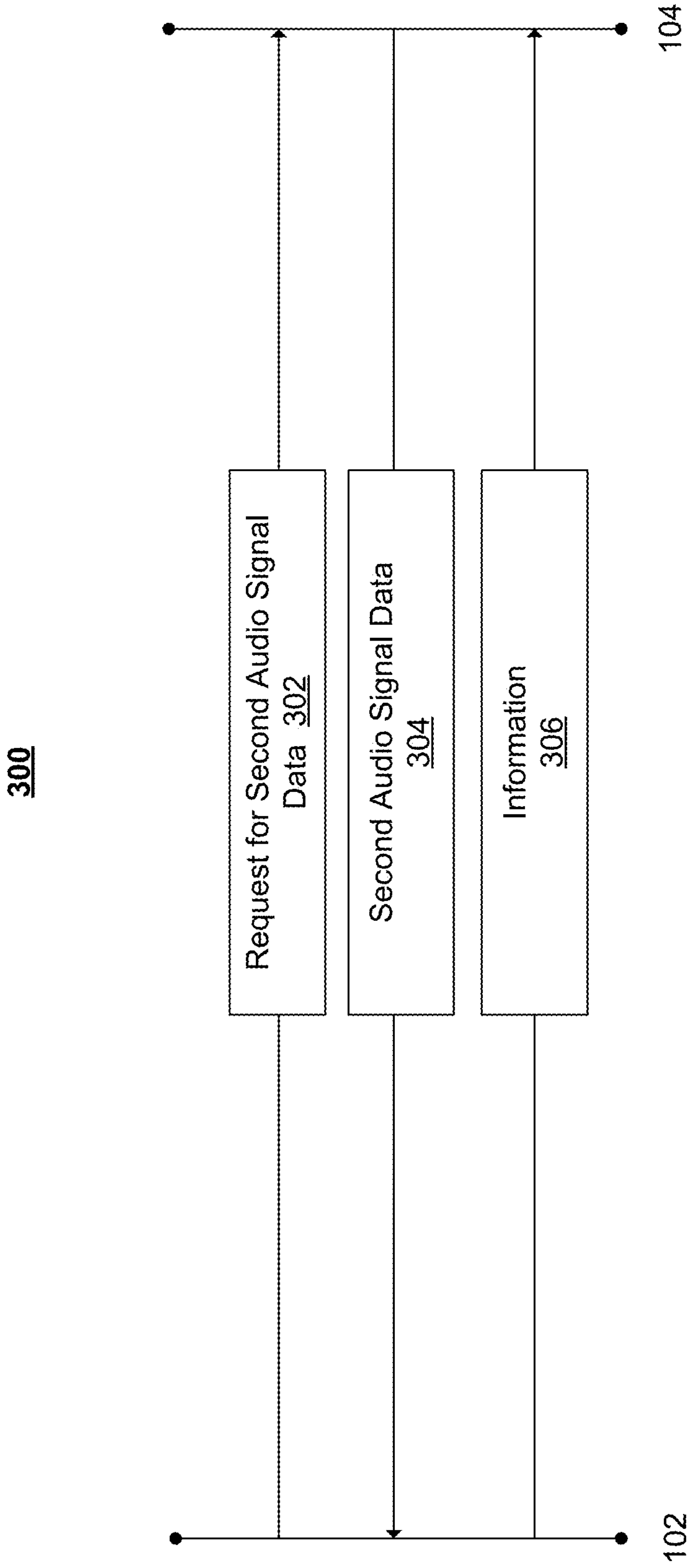
FIG. 3 depicts an example signal diagram 300, according to an example.

FIG. 3 depicts a signal diagram 300, according to an example. In signal diagram 300, it may be seen that first device 108 sends information 306 to second device 110. In examples, second user 104 may send information 306 to first user 102 as well.

Figure 1B:
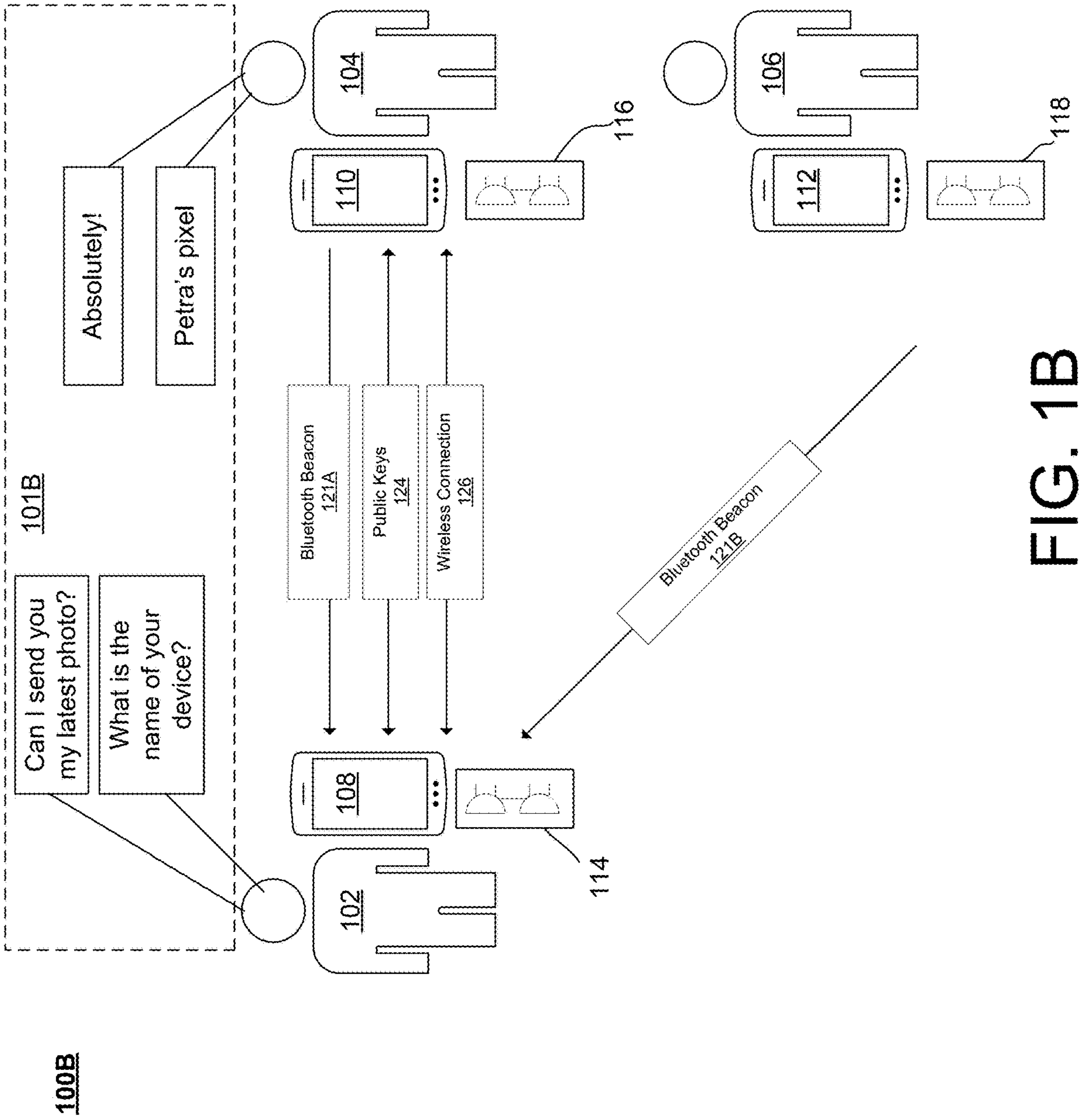
FIG. 1B depicts an example scenario 100B of users making and authenticating an information sharing request, according to an example.

FIG. 1B depicts a further scenario 100B, according to an example. In scenario 100B, first user 102 and second user 104 engage in an audio sequence 101B. In audio sequence 101B, first user 102 asks, "Can I send you my latest photo" to which second user 104 replies, "Absolutely!" first user 102 next asks, "What is the name of your device?" and second user 104 replies, "Petra's pixel." wireless connection initialization module 216 may then use the device identifier, "Petra's pixel" to establish wireless connection 126 with second device 110. Second device 110 periodically sends a Bluetooth beacon 121A and third device 112 periodically sends a Bluetooth beacon 121B, both of which may be received at first device 108, informing first device 108 of the device identifiers associated with those devices. This may allow first device 108 to establish a Bluetooth connection with second device 110 upon receiving the second identifier. As may be seen in 100B, third user 106 does not participate in audio sequence 101B. Therefore, first user 102 does not establish a communications channel with third device 112.

Verbally sharing a device identifier, as depicted in scenario 100B, may help authenticate second device 110 when the second user is too close to first device 108 to distinguish the direction of second device 110 with respect to first device 108.

Figure 1C:
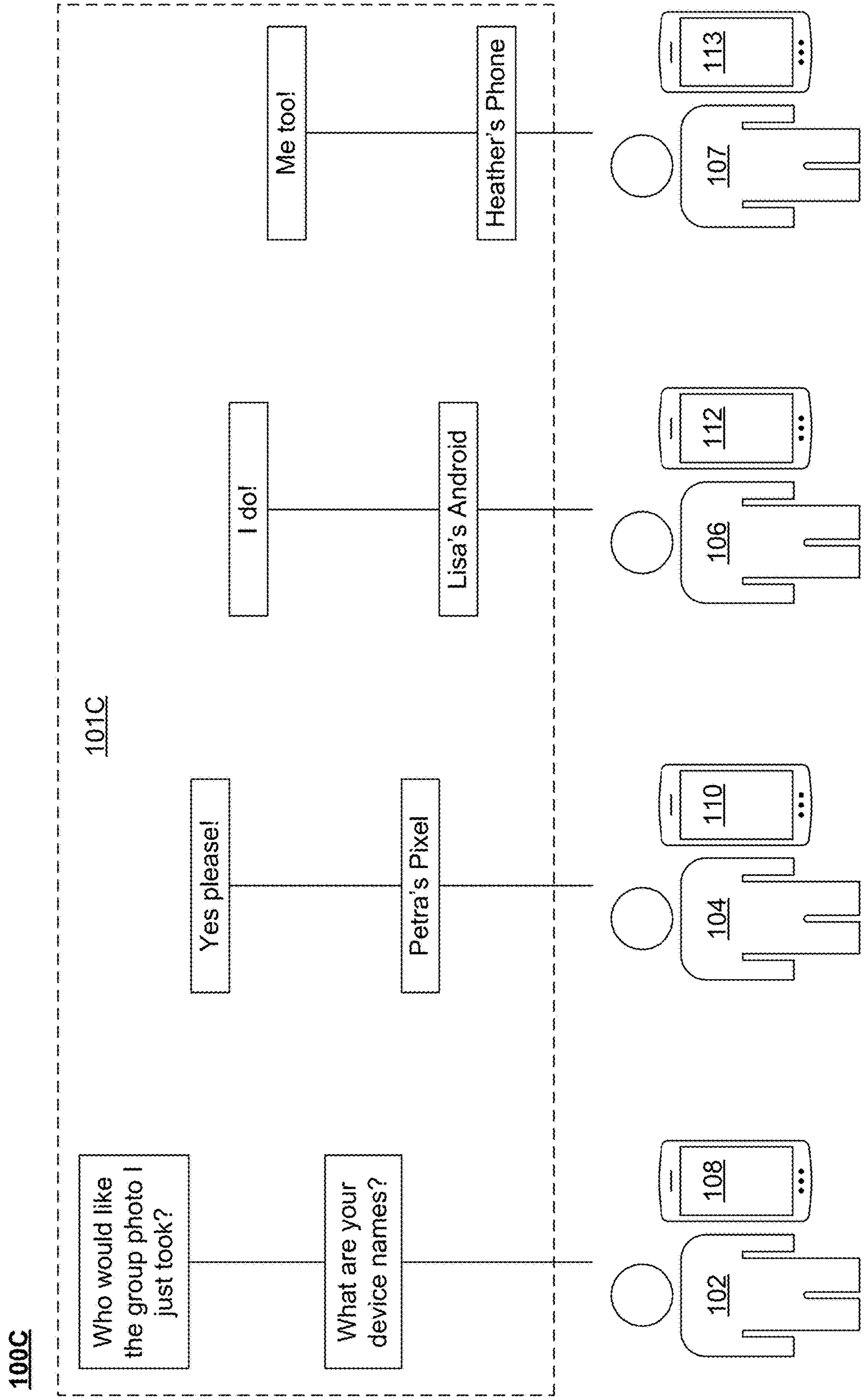
FIG. 1C depicts an example scenario 100C of users making and authenticating an information sharing request, according to an example.

FIG. 1C depicts a further scenario 100C, according to an example. In scenario 100C, first user 102, second user 104, third user 106, and a fourth user 107 engage in an audio sequence 101C. In audio sequence 101C, first user 102 asks, "Who would like the group photo I just took?" Each of second user 104, third user 106 and fourth user 107 respond affirmatively that they would like the photo. First user 102 next asks, "What are your device names?", and each of second user 104, third user 106, and fourth user 107 reply with a respective device name. First device 108 may then use each device name relating to second device 110, third device 112, and fourth device 113 to generate a separate wireless connection 126 to each device that may be used to facilitate the exchange of information 306.

Figure 2B:
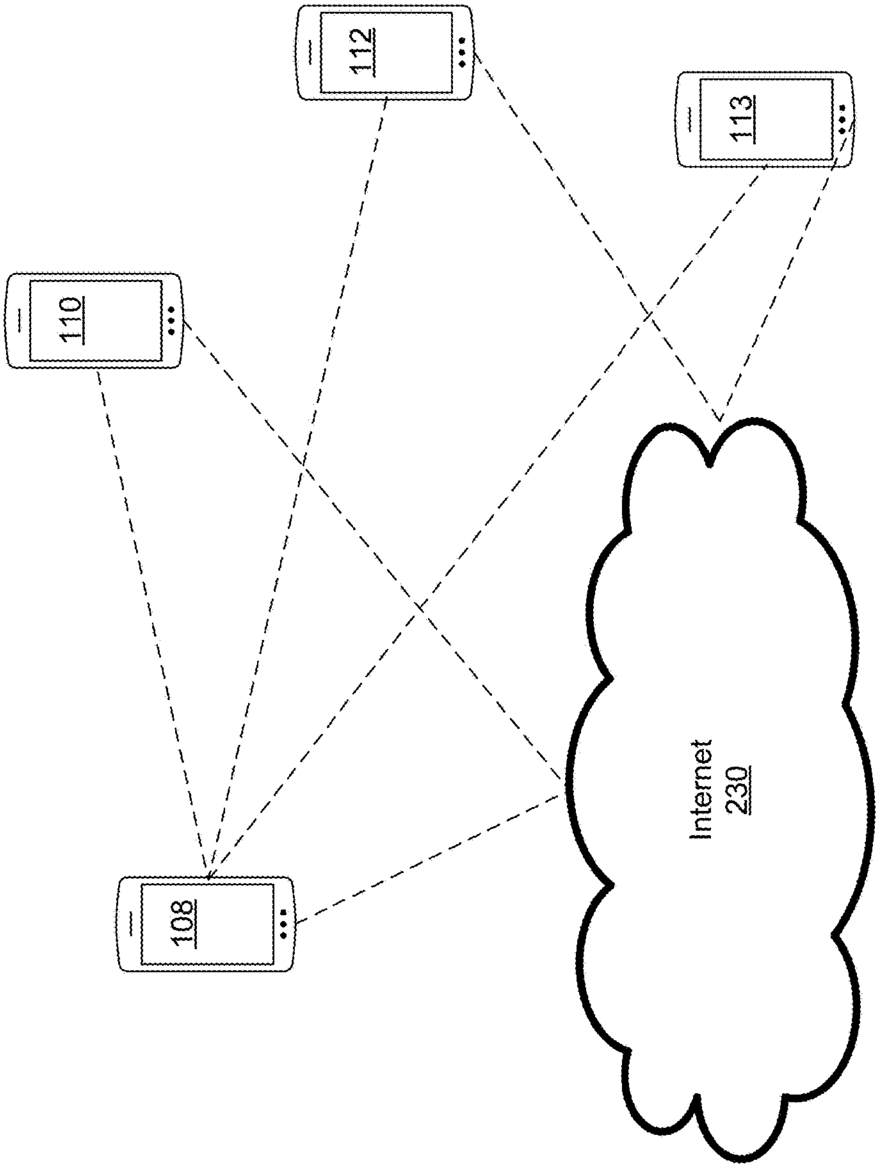
FIG. 2B depicts an example user device system 200B, according to an example.

For example, FIG. 2B depicts device system 200B, in accordance with an example. Device system 200B includes first device 108, second device 110, third device 112, and fourth device 113. In examples, first device 108 may communicate with any of second device 110, third device 112, fourth device 113 directly, e.g., using ultrasonic signals, BLUETOOTH signals, Wi-Fi signals, etc. In examples, first device 108 may communicate with any of second device 110, third device 112, fourth device 113 via internet 230.

Upon authenticating each of second device 110, third device 112, and fourth device 113, first device 108 may send or receive information 306 to each device, as described above.

In examples, other authentication methods may be desired. Processor 202 may include second audio file request module 218 and audio file verification module 220. Second audio file request module 218 may be operable to request a second audio signal data from the second device. The second audio signal data may include at least a portion of audio sequence 101A, 101B, 101C. For example, as depicted in FIG. 3, first device 108 may request second audio file 302 via wireless connection 126. In examples, second device 110 may send second audio signal data 304 to first device 108 in response.

In examples, first device 108 and/or second device 110 may include user settings or operating system settings allowing a user to decide both if and when a user device will respond to a request for second audio file 302. In examples, the user may select an option to require additional user confirmation, or for other conditions to be true, before second audio signal data 304 may be sent. In examples, the user may select an option to opt out of this feature entirely, or to suspend it for a period.

Next, audio file verification module 220 may verify that the first audio signal data includes a first feature correlating to a second feature of second audio signal data 304. In examples, the first and second features may be related to the at least a portion of the audio sequence. By correlated, what may be meant is that the first feature and the second feature are related, so that if the words spoken, the position of the users, or the volume of the user voices during audio sequence 101A, 101B, 101C were different, both the first feature and the second feature would change as well. In examples, the first feature and the second feature may be positively or negatively correlated to one another.

In examples, verifying that the first feature is correlated to the second feature may comprise determining that a first voice intensity in the first audio signal data is greater than a second voice intensity in the first audio signal data, and that a first voice intensity in the second audio signal data is less than a second voice intensity in the second audio signal data. This may be the case if first user 102 is positioned at a distance from second user 104, and each of first user 102 and second user 104 is collocated with their respective user device.

In examples, verifying that the first feature is correlated to the second feature may comprise determining if at least a portion of speech in the first audio signal data and at least a portion of speech in the second audio signal data both relate to a statement which is a portion of the audio sequence. For example, it may be determined that the first audio signal data and second audio signal data 304 both include the same statements, such as: "I would like to send you the photo I just took" or "Great! I would love to receive it."

In examples, verifying that the first feature is correlated to the second feature may comprise determining that a voice included in the first audio signal data associated with the information sharing request matches a voice ID associated with the second device. In examples, the voice ID may be generated by any software that can generate a voice biometric data or a voice fingerprint based on an audio file including a user voice. If audio file verification module 220 already has a pre-existing voice ID for one or more users, it may be possible to use that voice ID to identify users in an audio signal data. In other examples, however, audio file verification module 220 may generate a voice ID for at least one user based on first audio signal data and then use that voice ID to identify that at least one user in second audio signal data 304.

In examples, any combination of the methods described herein with respect to audio file verification module 220 may be used to verify that the first audio signal data correlates to second audio signal data 304. In examples, further methods to correlate first and second audio signal data may also be used.

By verifying that the second device can provide second audio signal data 304 that correlates with the first audio signal data, this may provide another layer of authentication for second device 110 with respect to first device 108. This may further increase the security of information sharing between user devices.

Figure 4A:
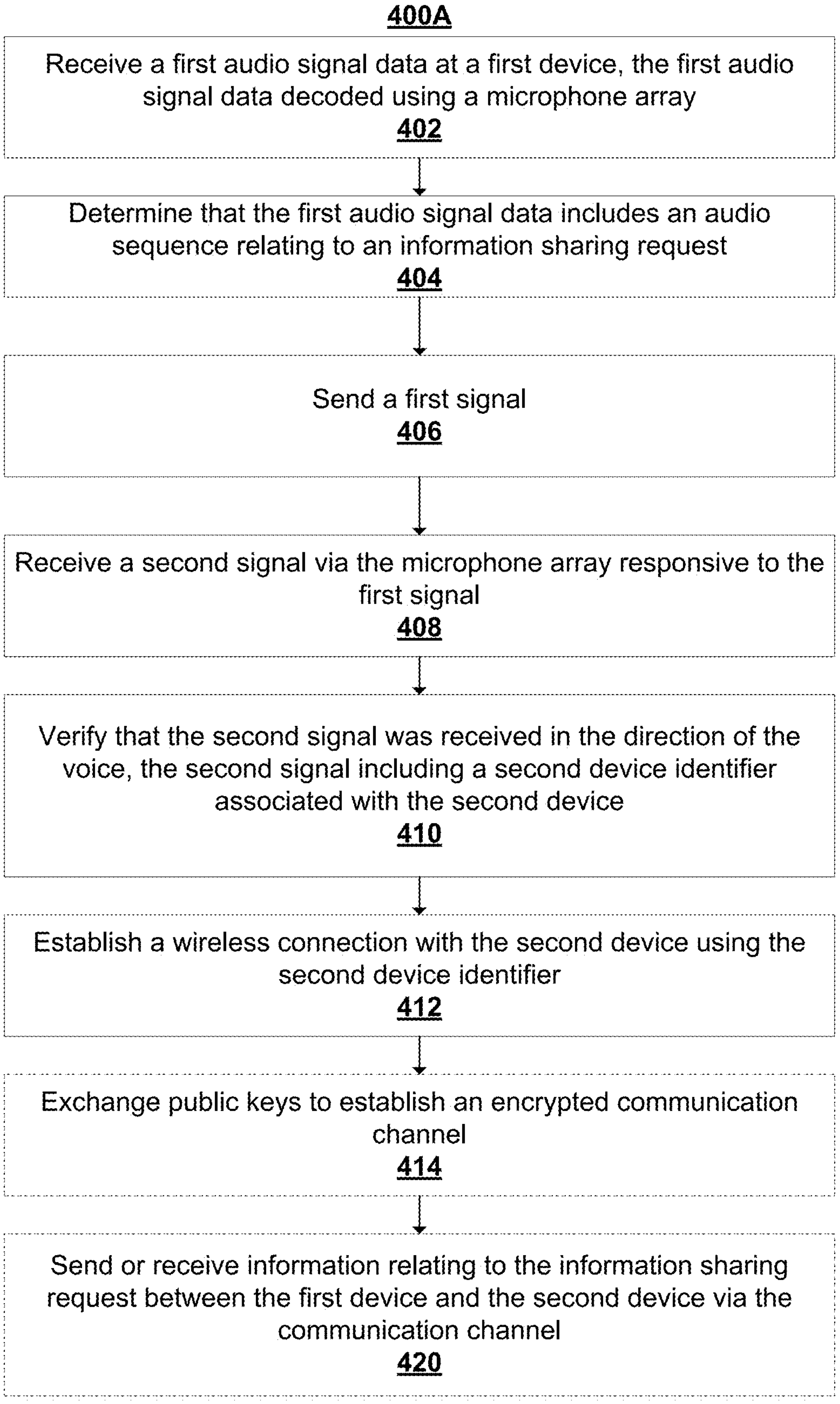
FIG. 4A depicts an example method 400A, according to an example.

FIG. 4A depicts method 400A, in accordance with an example. Method 400A may be used to authenticate a second user device before sharing information between devices. Method 400A begins with step 402. In step 402, a first audio signal data is received at first device 108, the first audio signal data decoded using first microphone array 114, as described above with respect to first audio signal data receiving module 211.

Method 400A continues with step 404. In step 404, it is determined that the first audio signal data includes audio sequence 101A, 101B, 101C relating to an information sharing request, as described with respect to information sharing request identification module 212 above.

Method 400A continues with step 406. In step 406, first signal 120 is sent to second device 110 in a direction of a voice from audio sequence 101A, 101B, 101C using first microphone array 114, as described above with respect to wireless signal authorization module 214.

Method 400A continues with step 408. In step 408, second signal 122 is received via microphone array 114 responsive to first signal 120, as described above with respect to wireless signal authorization module 214.

Method 400A continues with step 410. In step 410, it is verified that second signal 122 was received in the direction of the voice, second signal 122 including a second device identifier associated with second device 110, as described above with respect to wireless signal authorization module 214.

Method 400A continues with step 412. In step 412, a wireless connection is established with second device 110 using the second device identifier, as described above with respect to wireless connection initialization module 216.

In examples, method 400A may continue with step 414. In step 414, public keys 124 may be exchanged to establish an encrypted communication channel, as described above.

In examples, method 400A may continue with step 420. In step 420, information relating to the information sharing request may be sent or received between first device 108 and second device 110 via wireless connection 126, as described above with respect to information sharing module 222.

Figure 4B:
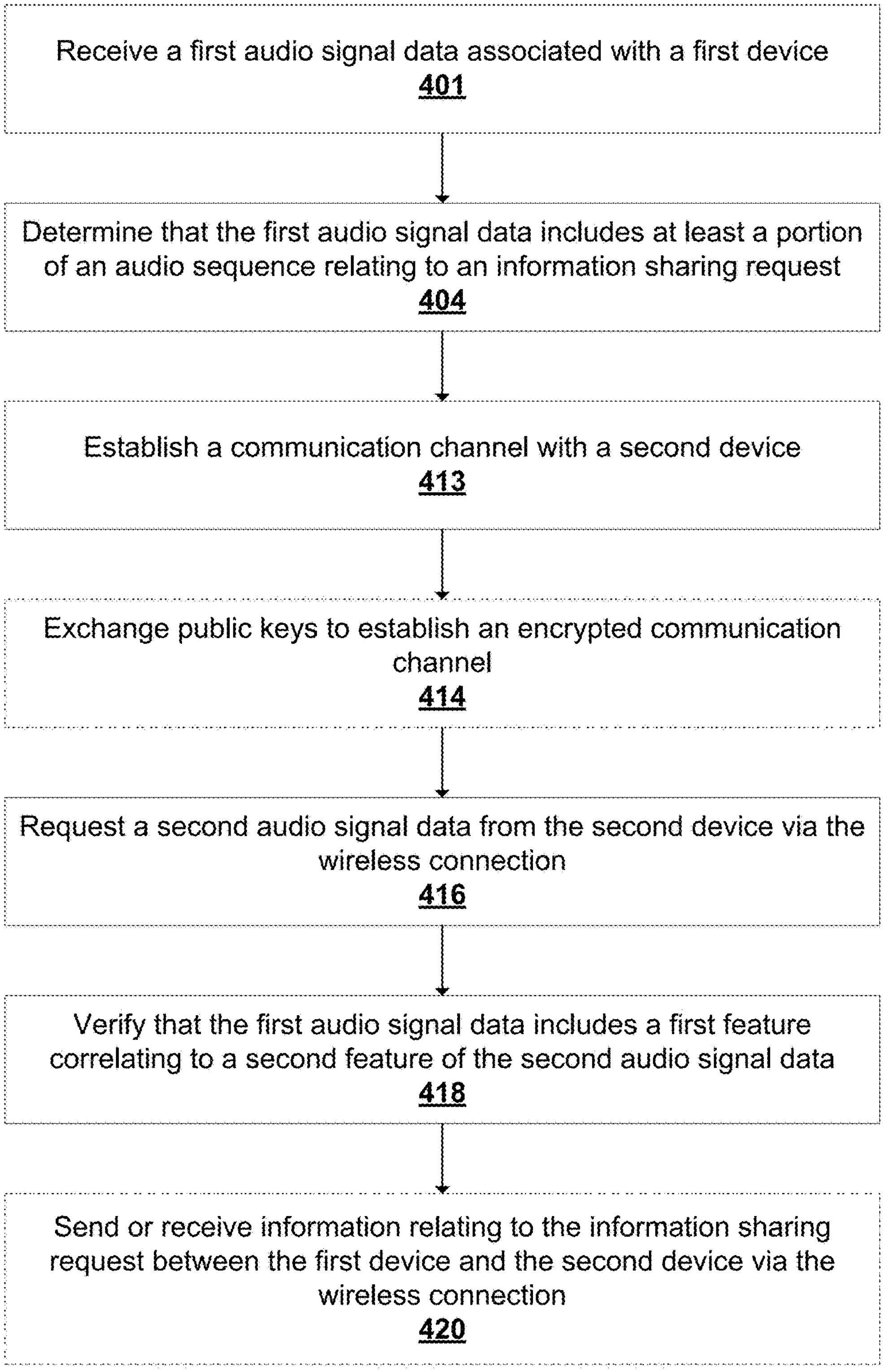
FIG. 4B depicts an example method 400B, according to an example.

FIG. 4B depicts method 400B, in accordance with an example. Method 400B may be used to authenticate a second user device before sharing information between devices. Method 400B begins with step 401. In step 401, a first audio signal data is received at first device 108. Step 401 is similar to step 402, except that first audio signal data may be captured using a single microphone or a microphone array.

Method 400B continues with step 404, which is described above.

Method 400B continues with step 413. In step 413, wireless connection 126 is established with second device 110. For example, wireless connection 126 may be established using any of the methods described with respect to wireless connection initialization module 216 above.

In examples, method 400B may include step 414, as described above.

Method 400B continues with step 416. In step 416, a second audio signal data is requested from second device 110 via wireless connection 126, as described above with respect to second audio file request module 218.

Method 400B continues with step 418. In step 418, it is verified that the first audio signal data includes a first feature correlating to a second feature of the second audio signal data, as described above with respect to audio file verification module 220. In examples, method 400B may include step 420, as described above.

In examples, method 400A may further include steps 416 and 418 of method 400B. In examples, method 400B may further include steps 406, 408, and 410 of method 400A.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The methods described in the disclosure provide for a novel, secure way to send information between user devices that is initiated by speech between users. The methods may not require the users to touch or interact with their user device screens to share information securely. This may allow for a seamless sharing of information triggered by a conversation between the users. By using directional ultrasound signals that can be compared to a direction of a user's voice, it may be possible to authenticate that a user device is indeed associated with the other user consenting to share information. By exchanging audio signal data between devices, it may be further possible to authenticate that the user device in question is indeed associated with the user consenting to share information.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, have many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), Graphics Processing Units (GPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

In some aspects, the techniques described herein relate to a method, wherein establishing the wireless connection further includes: exchanging public keys over the wireless connection to establish an encrypted communication channel.

In some aspects, the techniques described herein relate to a method, wherein the method further includes: requesting a second audio signal data from the second device; and verifying that the first audio signal data and the second audio signal data include correlated versions of the audio sequence.

In some aspects, the techniques described herein relate to a method, further including: sending or receiving information relating to the information sharing request between the first device and the second device via the wireless connection.

In some aspects, the techniques described herein relate to a method, wherein the information sent is at least one of: a file, contact information, or information providing access to a resource.

In some aspects, the techniques described herein relate to a computing device, wherein the memory is further configured to establish the wireless connection by exchanging public keys over the wireless connection to establish an encrypted communication channel.

In some aspects, the techniques described herein relate to a computing device, wherein the memory is further configured to: request a second audio signal data from the second device; and verify that the first audio signal data and the second audio signal data include correlated versions of the audio sequence.

In some aspects, the techniques described herein relate to a computing device, the memory is further configured to: send or receiving information relating to the information sharing request between the first device and the second device via the wireless connection.

In some aspects, the techniques described herein relate to a computing device, wherein the information sent is at least one of: a file, contact information, or information providing access to a resource.

In some aspects, the techniques described herein relate to a method, wherein establishing the wireless connection further includes: exchanging public keys to establish an encrypted communication channel.

In some aspects, the techniques described herein relate to a method, wherein the information sent is at least one of: a file, contact information, or information providing access to a resource.

In some aspects, the techniques described herein relate to a method, further including: sending a first signal to the second device; and receiving a second signal responsive to the first signal, the second signal including a second device identifier associated with the second device, and wherein the wireless connection is established with the second device using the second device identifier.

In some aspects, the techniques described herein relate to a method, wherein establishing the wireless connection further includes: identifying a second device identifier in the first audio signal data relating to the information sharing request, and wherein the wireless connection is established with the second device using the second device identifier.

In some aspects, the techniques described herein relate to a method, wherein verifying that the first feature is correlated to the second feature further includes at least one of: determining if at least a portion of speech in the first audio signal data and at least a portion of speech in the second audio signal data both relate to a statement which is a portion of the audio sequence; or determining that a voice included in the first audio signal data associated with the information sharing request matches a voice id associated with the second device.

In some aspects, the techniques described herein relate to a method, wherein at least one of the first audio signal data or the second audio signal data are recorded using an array of microphones.

In some aspects, the techniques described herein relate to a computing device, wherein establishing the wireless connection further includes: exchanging public keys to establish an encrypted communication channel.

In some aspects, the techniques described herein relate to a computing device, wherein the information sent is at least one of: a file, contact information, or information providing access to a resource.

In some aspects, the techniques described herein relate to a computing device, further including: sending a first signal; and receiving a second signal responsive to the first signal, the second signal including a second device identifier associated with the second device, and wherein the wireless connection is established using the second device using the second device identifier.

In some aspects, the techniques described herein relate to a computing device, wherein the first signal is sent in a direction of a user associated with the audio sequence relating to the information sharing request.

In some aspects, the techniques described herein relate to a computing device, wherein establishing the wireless connection further includes: identifying a second device identifier in the first audio signal data relating to the information sharing request, and wherein the wireless connection is established with the second device using the second device identifier.

In some aspects, the techniques described herein relate to a computing device, wherein verifying that the first feature is correlated to the second feature further includes at least one of: determining if at least a portion of speech in the first audio signal data and at least a portion of speech in the second audio signal data both relate to a statement which is a portion of the audio sequence; or determining that a voice included in the first audio signal data associated with the information sharing request matches a voice id associated with the second device.

In some aspects, the techniques described herein relate to a computing device, wherein at least one of the first audio signal data or the second audio signal data are recorded using an array of microphones.

What is claimed is:

1. A method comprising:
- receiving audio data including an identifier associated with a device;
- receiving, from the device, a signal including a network address and the identifier;
- determining that the audio data includes the identifier and that the signal includes the identifier; and
- in response to determining that the audio data includes the identifier and that the signal includes the identifier:
  - establishing a wireless connection with the device using the network address, and
  - using the wireless connection to exchange information with the device.

2. The method of claim 1, wherein the wireless connection is used to exchange the information with the device in response to determining that the audio data includes an information request related to the information.

3. The method of claim 1, wherein the audio data is a first audio data,
- the method further comprises receiving second audio data including an information request related to the information, and
- the wireless connection is used to exchange the information with the device in response to determining the second audio data includes the information request.

4. The method of claim 1, wherein the information sent is at least one of: a file, contact information, or information providing access to a resource.

5. The method of claim 1, wherein establishing the wireless connection further includes exchanging public keys over the wireless connection to establish an encrypted communication channel.

6. The method of claim 1, wherein the signal is a short-range wireless signal and the signal is determined to include the identifier in response to verifying that a signal strength of the short-range wireless signal exceeds a proximity threshold.

7. A system comprising:
- a processor; and
- a memory configured with instructions to:
  - receive audio data including an identifier associated with a device;
  - receive, from the device, a signal including a network address and the identifier;
  - determine that the audio data includes the identifier and that the signal includes the identifier; and
  - in response to determining that the audio data includes the identifier and that the signal includes the identifier:
    - establish a wireless connection with the device using the network address, and
    - use the wireless connection to exchange information with the device.

8. The system of claim 7, wherein the wireless connection is used to exchange the information with the device in response to determining that the audio data includes an information request related to the information.

9. The system of claim 7, wherein the information sent is at least one of: a file, contact information, or information providing access to a resource.

10. The system of claim 7, wherein establishing the wireless connection further includes exchanging public keys over the wireless connection to establish an encrypted communication channel.

11. A non-transitory computer readable medium storing executable instructions that, when executed by a processor, cause a computing device to:
- receive audio data including an identifier associated with a device;
- receive, from the device, a signal including a network address and the identifier;
- determine that the audio data includes the identifier and that the signal includes the identifier; and
- in response to determining that the audio data includes the identifier and that the signal includes the identifier:
  - establish a wireless connection with the device using the network address, and
  - use the wireless connection to exchange information with the device.

12. The non-transitory computer readable medium of claim 11, wherein the wireless connection is used to exchange the information with the device in response to determining that the audio data includes an information request related to the information.

13. The non-transitory computer readable medium of claim 11, wherein the information exchanged is at least one of: a file, contact information, or information providing access to a resource.

14. The non-transitory computer readable medium of claim 11, wherein establishing the wireless connection further includes exchanging public keys over the wireless connection to establish an encrypted communication channel.

15. The method of claim 1, wherein the signal is an ultrasonic signal and the signal is determined to include the identifier in response to verifying that the ultrasonic signal is received from a direction correlating with a source of the audio data.

16. The method of claim 1, wherein the signal is an ultra-wideband signal and the signal is determined to include the identifier in response to determining that a distance to the device is within a threshold distance based on a time-of-flight measurement of the ultra-wideband signal.

17. The method of claim 1, wherein the network address includes a unique address assigned to the device and establishing the wireless connection includes establishing a peer-to-peer communication channel by transmitting a connection request directly to the unique address assigned to the device.

18. The method of claim 1, wherein the network address includes a unique address assigned to the device and establishing the wireless connection includes verifying a location of the device by determining that a signal strength associated with the unique address assigned to the device exceeds a threshold signal strength.

19. The method of claim 1, wherein the signal is determined to include the identifier in response to receiving the signal within a threshold time period of receiving the audio data.

20. The method of claim 1, further comprising generating a candidate identifier from the audio data using natural language processing, wherein determining that the signal includes the identifier includes determining a correspondence between the candidate identifier and data included in the signal.

* * * * *